(12) United States Patent
Kazerani et al.

(10) Patent No.: US 9,961,152 B2
(45) Date of Patent: *May 1, 2018

(54) DYNAMIC TAG MANAGEMENT FOR OPTIMIZING CONTENT DELIVERY

(71) Applicant: Verizon Digital Media Services Inc., Los Angeles, CA (US)

(72) Inventors: Alexander A. Kazerani, Santa Monica, CA (US); Robert J. Peters, Santa Monica, CA (US)

(73) Assignee: VERIZON DIGITAL MEDIA SERVICES INC., Playa Vista, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/242,989

(22) Filed: Aug. 22, 2016

(65) Prior Publication Data

US 2016/0359988 A1 Dec. 8, 2016

Related U.S. Application Data

(63) Continuation of application No. 14/638,622, filed on Mar. 4, 2015, now Pat. No. 9,424,363, which is a
(Continued)

(51) Int. Cl.
*G06F 15/167* (2006.01)
*H04L 29/08* (2006.01)
(Continued)

(52) U.S. Cl.
CPC .......... *H04L 67/18* (2013.01); *G06F 17/3087* (2013.01); *G06F 17/3089* (2013.01);
(Continued)

(58) Field of Classification Search
CPC ..... H04L 29/08; H04L 67/20; H04L 67/2823; H04L 67/2838; H04L 67/18; H04L 67/2842; H04L 61/00; H04L 69/40
(Continued)

(56) References Cited

U.S. PATENT DOCUMENTS 6,061,798 A 5/2000 Coley et al.
7,010,578 B1 3/2006 Lewin et al.
(Continued)

OTHER PUBLICATIONS

Toyama, Kentaro, Ron Logan, and Asia Roseway. "Geographic location tags on digital images." Proceedings of the eleventh ACM international conference on Multimedia. ACM, 2003.
(Continued)

*Primary Examiner* — Tauqir Hussain
(74) *Attorney, Agent, or Firm* — Los Angeles Patent Group; Arman Katiraei

(57) ABSTRACT

Some embodiments provide a content delivery network (CDN) solution that affords the CDN control over those elements of customer content that are delivered by third parties. The CDN integrates a distributed set of monitoring agents. Each monitoring agent monitors the delivery performance of third parties to the region in which the agent operates. The CDN uses the performance monitoring information to dynamically manage the content tags to the third-party delivered elements of CDN-customer content. Specifically, a CDN server retrieves the parent page for requested CDN-customer content. The CDN server identifies the region from where the request originates and retrieves the logs from the monitoring agents monitoring from that region. The CDN server then modifies the base page by dynamically removing the tags to the third-party delivered elements that are reported in the monitoring agent logs as being unavailable, inaccessible, or underperforming in the identified region.

19 Claims, 10 Drawing Sheets

Related U.S. Application Data continuation of application No. 13/834,241, filed on Mar. 15, 2013, now Pat. No. 9,037,643.

(51) Int. Cl.
| | | |
|---|---|---|
| *H04L 29/14* | (2006.01) | |
| *H04L 12/26* | (2006.01) | |
| *G06F 17/30* | (2006.01) | |
| *H04L 29/06* | (2006.01) | |
| *H04L 12/24* | (2006.01) | |
| *H04L 29/12* | (2006.01) | |

(52) U.S. Cl.
CPC .. *G06F 17/30241* (2013.01); *G06F 17/30902* (2013.01); *H04L 43/0858* (2013.01); *H04L 43/10* (2013.01); *H04L 43/16* (2013.01); *H04L 65/602* (2013.01); *H04L 67/02* (2013.01); *H04L 67/20* (2013.01); *H04L 67/2823* (2013.01); *H04L 67/2838* (2013.01); *H04L 67/2842* (2013.01); *H04L 67/2847* (2013.01); *H04L 67/32* (2013.01); *H04L 69/40* (2013.01); *H04L 41/048* (2013.01); *H04L 61/1511* (2013.01); *H04L 61/6009* (2013.01); *H04L 61/609* (2013.01)

(58) Field of Classification Search
USPC .......................................................... 709/213
See application file for complete search history.

(56) References Cited

U.S. PATENT DOCUMENTS

| | | | | |
|---|---|---|---|---|
| 7,925,835 | B2* | 4/2011 | Elazary | G06F 12/12 711/133 |
| 8,271,659 | B2* | 9/2012 | Irudayaraj | H04L 63/02 709/226 |
| 8,316,446 | B1* | 11/2012 | Campbell | G06F 21/554 380/201 |
| 8,626,876 | B1* | 1/2014 | Kokal | H04L 67/06 709/203 |
| 8,719,381 | B2* | 5/2014 | Scharber | H04L 67/34 370/252 |
| 2002/0120727 | A1* | 8/2002 | Curley | H04L 41/12 709/223 |
| 2005/0021862 | A1* | 1/2005 | Schroeder | G06Q 30/02 709/246 |
| 2007/0083648 | A1 | 4/2007 | Addleman | |
| 2008/0008089 | A1 | 1/2008 | Bornstein et al. | |
| 2008/0126944 | A1* | 5/2008 | Curtis | G06F 17/30896 715/733 |
| 2008/0183672 | A1* | 7/2008 | Canon | G06F 17/30905 |
| 2008/0208868 | A1 | 8/2008 | Hubbard | |
| 2008/0215718 | A1* | 9/2008 | Stolorz | H04L 61/1511 709/223 |
| 2009/0193096 | A1 | 7/2009 | Boyer et al. | |
| 2009/0235167 | A1* | 9/2009 | Boyer | G06Q 10/10 715/708 |
| 2010/0031160 | A1* | 2/2010 | Boyer | G06F 17/30893 715/744 |
| 2010/0211776 | A1* | 8/2010 | Gunaseelan | G06F 21/10 713/165 |
| 2011/0055386 | A1* | 3/2011 | Middleton | H04L 67/125 709/224 |
| 2011/0185016 | A1 | 7/2011 | Kandasamy | |
| 2011/0213840 | A1* | 9/2011 | Boyer | G06F 17/30 709/205 |
| 2011/0219109 | A1* | 9/2011 | Zehavi | H04L 29/08729 709/223 |
| 2011/0225647 | A1 | 9/2011 | Dilley et al. | |
| 2012/0011567 | A1* | 1/2012 | Cronk | H04L 63/102 726/4 |
| 2012/0054266 | A1 | 3/2012 | Kazerani et al. | |
| 2012/0297287 | A1* | 11/2012 | Martin | G06F 17/30861 715/234 |
| 2014/0025807 | A1 | 1/2014 | Wiener et al. | |

OTHER PUBLICATIONS

Du, Rongbo, Reihaneh Safavi-Naini, and Willy Susilo. "Web filtering using text classification." Faculty of Informatics-Papers (2003): 166.

* cited by examiner

```
    <ul id="solutionsLanding" class="overlay fader flush clearfix">         410
        <li>    <a href="/solutions/ecommerce/">
                <img src="http://www.cdn.com/img/ecommerce_small.jpg"
alt="ecommerce cdn" style="opacity: 0.35; ">
                <strong>E-Commerce</strong></a>
                <p>A faster e-commerce site means better search rankings, more
customers, and more profit <a class="go" href="/solutions/ecommerce/">...</a></p></li>
        <li>
                <a href="/solutions/whole-site-acceleration/">
                <img src="http://www.cdn.com/img/siteacceleration_small.jpg"
alt="whole site acceleration" style="opacity: 0.35; ">
                <strong>Whole Site Acceleration</strong></a>
                <p>Make sure all your content - whether dynamic or static - loads as
quickly as possible <a class="go" href="/solutions/whole-site-acceleration/">...</a></p></li>
        <li class="row-end">
                <a href="/solutions/licensed-cdn/">
                <img src="http://www.cdn.com/img/carrier-cdn-small.jpg" alt="carrier
telco licensed CDN" style="opacity: 0.35; ">
                <strong>Licensed / Carrier CDN</strong></a>
                <p>Turn your existing IP network into a feature-rich, profitable
content delivery network. <a class="go" href="/solutions/licensed-cdn/">...</a></p></li>
```

```
<dl id="latestTweet">                                                       420
    <dt>Latest from Twitter</dt>
    <dd>
    <ul id="twitter_update_list">
    <li>Loading Tweets...</li></ul></dd>
    <script src="http://api.twitter.com/1/statuses/user_timeline/edgecast.json?count=1"
type="text/javascript"></script>
</dl>
```

```
<script type="text/javascript">                                             430
var DID=83289;
var pcheck=(window.location.protocol == "https:") ? "https://sniff.visistat.com/live.js":"http://
stats.visistat.com/live.js";
document.writeln('<scr'+'ipt src="'+pcheck+'" type="text\/javascript"><\/scr'+'ipt>');
</script>
```

```
<script type="text/javascript">                                             440
(function(d,s,i,r) {
if (d.getElementById(i)){return;}
var n=d.createElement(s),e=d.getElementsByTagName(s)[0];
n.id=i;n.src='//js.hubspot.com/analytics/'+(Math.ceil(new Date()/r)*r)+'/212415.js';
e.parentNode.insertBefore(n, e);
})(document,"script","hs-analytics",300000);
</script>
```

Figure 4

DYNAMIC TAG MANAGEMENT FOR OPTIMIZING CONTENT DELIVERY

CLAIM OF BENEFIT TO RELATED APPLICATIONS

This application is a continuation of U.S. nonprovisional application Ser. No. 14/638,622 entitled "Dynamic Tag Management for Optimizing Content Delivery", filed Mar. 4, 2015 which is a continuation of U.S. nonprovisional application Ser. No. 13/834,241 entitled "Dynamic Tag Management for Optimizing Content Delivery", filed Mar. 15, 2013, now U.S. Pat. No. 9,037,643. The contents of application Ser. Nos. 14/638,622 and 13/834,241 are hereby incorporated by reference.

TECHNICAL FIELD

The present invention relates to improving content delivery performance by dynamically managing which content tags are called.

BACKGROUND ART

Much of today's content is delivered over data networks that collectively form the Internet. Usually, this content is composed of one or more elements. These elements can include text, audio, video, images, multimedia, applications, advertisements, or some combination thereof. For specific content, the identification and retrieval of the included elements are controlled by a set of "child tags" that are specified in a "parent page" for that content. A child tag identifies a content element. A parent page is any page or file that directly or indirectly includes one or more child tags. A parent page directly includes a child tag by defining the tag within the body of the parent page. A parent page indirectly includes a child tag by including a reference or link to another parent page that then defines the child tag. Accordingly, the parent page can be a base page, include file, header file, metadata containing file, or other pages or files associated with customer content.

A tag can be a link or a script. The link can specify a Uniform Resource Locator or other reference identifying one or more of the content's elements (e.g., the HTML "src" tag). The script can specify a set of instructions for one or more of the content's elements. Scripts can be specified using a variety of languages including JavaScript and PERL as some examples.

The user experience is determined based on the speed with which all of the elements associated with the child tags of one or more parent pages are delivered. The user is typically unaware or unconcerned with the fact that the elements may be delivered from different servers or different sources. For example, a particular content provider may specify a parent page for its website, with the parent page including child tags for populating the website with an advertisement, a video, and different images. The parent page, as well as the images, may be delivered from the content provider's own servers, the advertisement may be delivered from a third-party advertisement server, and the video may be delivered from the server of a third-party video hosting service provider. The user simply expects all these elements to load within some time frame. When one or more of the elements continues to load beyond that time frame, the user may become disinterested, frustrated, or otherwise indifferent to that content and as a result, navigate away from the particular content provider's website.

To improve the user experience, content providers have come to rely on content delivery networks (CDNs) for expedited delivery of their content. CDNs cache the content provider content at different points-of-presence (PoP) throughout the network. This allows the CDN to serve the content to different users from locations that are geographically proximate to those users. As a result, the content can be delivered with less latency and with fewer network errors. Moreover, the CDN inherently provides failover because of its redundant caching at its different PoPs. Should one PoP become inaccessible, the same content can be served from a different PoP.

However, the CDN is only able to accelerate the delivery for the elements of the content provider content that it hosts. The CDN itself is reliant on third-party servers to deliver the other elements for services of those third parties. Some such elements include dynamically generated content or restricted content of the third parties that cannot be cached by the CDN. As some examples, the third-party delivered content elements can include advertisements from third-party advertising servers, social media feeds from third-party social media sites, video from third-party video hosting servers, as well as analytics, monitoring tools, scripts, and other applications from third-party tracking servers. Accordingly, content may include a third party delivered element without the recipient for the content even knowing about the included third party delivered element. For example, a third party delivered element can include a single pixel graphic or token object that is unperceivable, but that the third party uses to track and monitor the recipient. If any one of these third-party servers is down or otherwise performs poorly, the delivery of the overall content is degraded.

Exacerbating the situation are various regional, enterprise, and national firewalls that block certain content and content elements from certain content providers. For example, it is not uncommon for countries with restrictive speech policies to block tags identifying content elements that are retrieved from social media sites such as www.facebook.com and www.twitter.com. Therefore, even when the CDN delivers elements of CDN-customer content that are not blocked, the parent page for that same CDN-customer content may include a tag to a blocked element that is delivered by a third-party. The blocked element would then delay the overall delivery of the customer's content.

Accordingly, there is a need to empower a CDN with more control over elements of CDN-customer content that are delivered by third parties. To this end, there is a need to enable the CDN to identify, from the customer hosted content, tags to elements that are hosted by other third parties that are unavailable, inaccessible, or severely underperforming. There is further a need to enable the CDN to dynamically modify or remove these tags when the CDN-customer content elements to which the tags point are unavailable, inaccessible, or severely underperforming from the third-party. Generally, there is a need for the CDN to prevent the degradation of the overall delivery performance for the CDN-customer content and the receiving user's experience, due to poorly performing or inaccessible third parties.

SUMMARY OF THE INVENTION

It is an objective of the embodiments described herein to provide a content delivery network (CDN) solution that affords the CDN control over those elements of customer content that are delivered by third parties. To this end, it is an objective to allow the CDN to dynamically manage the tags that call and retrieve such third-party delivered elements of CDN-customer content. In managing the tags, it is an objective to allow the CDN to dynamically remove those tags that point to elements that cannot be delivered to or are otherwise unavailable from the responsible third-party to specific regions from which the content elements are requested.

To achieve these and other objectives, some embodiments integrate a monitoring system as part of the CDN deployment. The monitoring system uses a distributed set of monitoring agents. Each monitoring agent monitors the content delivery performance of various third parties to the region in which the monitoring agent operates. The monitored third parties include those that deliver one or more of the content elements identified by child tags within parent pages defining CDN-customer content. The performance for the monitored content elements as well as the location of the monitoring agent is logged and reported to the CDN.

The CDN uses the performance monitoring information to dynamically manage the content tags to the third-party delivered elements of CDN-customer content. Specifically, the CDN caching servers deliver modified parent pages in response to user requests for content, wherein a modified parent page excludes any child tags to third-party delivered elements of CDN-customer content that are unavailable, inaccessible, or that are delivered with excessive delay to the region in which the request originates. For example, the CDN can optimize content delivery by excluding tags to third-party delivered elements of CDN-customer in a first region when those elements are blocked due to firewalls set up in the first region, but include those same tags when delivering the same elements to a second region that does not impose such restrictions. In this manner, the CDN can optimize the user experience by controlling not only the elements of CDN-customer content delivered by the CDN's servers, but also the elements of the same CDN-customer content that are delivered by various third parties operating servers independent of the CDN servers.

In some embodiments, the monitoring agents periodically provide the performance measurements to one or more CDN caching servers. When a CDN caching server receives a request for a parent page that includes a child tag to a third-party delivered element of CDN-customer content, the CDN caching server identifies the region from where the request originates. The server then obtains the performance measurement logs from the monitoring agents that operate in or near that region. The CDN caching server analyzes the requested parent page to identify the tags that reference the one or more third-party delivered elements of CDN-customer content. Using the performance measurements from the obtained logs, the CDN caching server determines if those third-party delivered elements of CDN-customer content are available, accessible, or under-performing in the identified region. The CDN caching server then modifies the parent page by dynamically removing the tags to the third-party delivered elements of CDN-customer content that are identified from the performance measurements of the monitoring agent logs to be unavailable, inaccessible, or under-performing. In some embodiments, rather than remove the tags to the unavailable, inaccessible, or underperforming third-party delivered elements of CDN-customer content, the CDN caching server replaces the tags with new tags that identify alternate content that is available, accessible, or well performing within the identified region. The CDN caching server responds to the user's request by submitting the modified parent page to the user. The user then obtains the desired content by requesting the content elements identified by the tags retained in the modified parent page.

In some embodiments, the task of modifying the parent pages is centralized in the CDN and thereby offloaded from the CDN caching servers. In some such embodiments, the monitoring agents provide their performance measurements to a CDN tag management server. The tag management server retains a copy of unmodified parent pages for CDN-customer content. The tag management server modifies the parent pages on a regional basis according to the performance measurement logs from the one or more monitoring agents that operate in the corresponding region. For example, the tag management server produces a first modified parent page for particular customer content to provide in response to requests that originate within China and a second modified parent page for the particular CDN-customer content to provide in response to requests that originate within Australia, wherein the first and second modified parent pages are produced from the same unmodified parent page and with the first modified parent page retaining a different set of tags from the unmodified parent page than the second modified parent page. The tag management server then provides the CDN caching servers with the appropriate modified parent pages and the CDN caching servers disseminate the proper modified parent pages in response to user requests.

Specifically, when a CDN caching server receives a user request for an unmodified parent page, that CDN caching server submits a query for the parent page to the tag management server. The query can include identifying the unmodified parent page being requested from the CDN caching server and the requesting user's geographic region. Based on this information, the tag management server selects the appropriate modified parent page for the requested unmodified parent page. Alternatively, the CDN caching server query to the tag management server can identify and request the appropriate modified parent page. In such instances, the CDN caching server is configured with a set of rules that can be applied to the requests for unmodified parent pages. Specifically, an identifier for the requested unmodified parent page and the requesting user's geographic region are input to the set of rules with the output identifying the appropriate modified parent page that is produced for the identified geographic region. The CDN caching server then queries the tag management server for the specific modified parent page. In response to the query, the tag management server responds with the modified parent page that excludes any tags to third-party delivered elements of CDN-customer content that are unavailable, inaccessible, or underperforming within the requesting user's geographic region or with a modified parent page that replaces tags to unavailable, inaccessible, or underperforming content elements with new tags to content elements that are available, accessible, and well-performing within the requesting user's geographic region. The CDN caching server responds to the user's request by submitting the tag management server provided modified parent page to the user.

The CDN caching servers can cache the modified parent pages for a specified duration. Caching the modified parent pages eliminates the need to query the tag management server for every request for the same parent page that originates from the same geographic region. A time-to-live (TTL) parameter may be specified when caching the modified parent page. When the TTL parameter times out, the CDN caching server can check with the tag management server to determine if a new instance for the cached modified parent page exists. If so, the CDN caching server purges the previous cached instance. Optionally, the CDN caching server retrieves the new instance from the tag management server. The CDN caching server can also purge without refreshing until a new request for that modified parent request is received. If no change is detected to the cached instance upon expiration of the TTL, the CDN caching server can retain the cached instance of the modified parent page and reset the TTL value.

The tag management server can also actively manage the modified parent pages that are cached by the CDN caching servers. In some such implementations, the tag management server continues to act as a central server that receives the performance measurements from the monitoring agents, produces the modified parent pages based on the performance measurements, and distributes the modified parent pages to the CDN caching servers. To actively manage the caching of the modified parent pages by the CDN caching servers, the tag management server issues messages to the CDN caching servers to cause those servers to purge cached instances of modified parent pages when those pages are updated by the tag management server. The updating may occur as a result of a change in a performance measurement, wherein such a change can result in the tag management server reintroducing a previously removed tag or removing a previously retained tag from a previous instance of modified parent page, thereby creating a new instance of that modified parent page.

In some embodiments, the dynamic tag management functionality can be enabled with no change to the CDN-customer content. In some other embodiments, the tag management functionality is enabled by inserting a specific CDN provided tag within an unmodified parent page. The CDN specific tag comprises instructions to identify the tags that point to the third-party delivered elements of CDN-customer content, determine the performance to those elements based on the monitoring agent logs, and remove the corresponding tags when the elements are unavailable, inaccessible, or underperforming. Additionally, the CDN specific tag may include logic to replace a tag to an unavailable, inaccessible, or underperforming third-party delivered element of CDN-customer content with a tag to a substitute element. In some embodiments, the CDN specific tag causes all tags for the CDN-customer content to be loaded in a non-blocking manner regardless of whether those tags were originally specified to be blocking or non-blocking.

BRIEF DESCRIPTION OF THE DRAWINGS

In order to achieve a better understanding of the nature of the present invention, preferred embodiments for the dynamic CDN tag management systems and methods will now be described, by way of example only, with reference to the accompanying drawings in which:

FIG. 4 presents various code snippets to different elements of CDN-customer content specified in a parent page.

DETAILED DESCRIPTION

In the following detailed description, numerous details, examples, and embodiments for a dynamic content delivery network (CDN) tag management solution are set forth and described. As one skilled in the art would understand in light of the present description, the solution is not limited to the embodiments set forth, and the solution may be practiced without some of the specific details and examples discussed. Also, reference is made to the accompanying figures, which illustrate specific embodiments in which the solution can be practiced. It is to be understood that other embodiments can be used and structural changes can be made without departing from the scope of the embodiments herein described.

CDN-customer content may be embedded with tags that link to content elements that are hosted and delivered by the CDN operated caching servers as well as one or more tags that link to content elements that are hosted and delivered by servers that are independently operated by various third parties (i.e., third-party delivered content elements). Ordinarily, the CDN has no control over the third-party delivered elements of CDN-customer content. The CDN blindly relies on those third parties to deliver their portion of the CDN-customer content. Issues arise however, when those third-party delivered elements of CDN-customer content are unavailable, inaccessible, or underperforming in various regions because of inadequate server resources provided by the third parties, network errors occurring in the paths connecting the third-party servers to destination regions, or restrictive policies (i.e., firewalls) that prevent the third-party delivered elements of CDN-customer content from entering one or more regions.

The dynamic CDN tag management solution enables the CDN to optimize the user experience by providing to the CDN dynamic control over all elements included within CDN-customer content. The dynamic tag management solution allows the CDN to remove those tags to third-party delivered elements of CDN-customer content that are unavailable, inaccessible, or underperforming as a result of network failures, downed servers, or restrictive firewalls.

Figure 1:
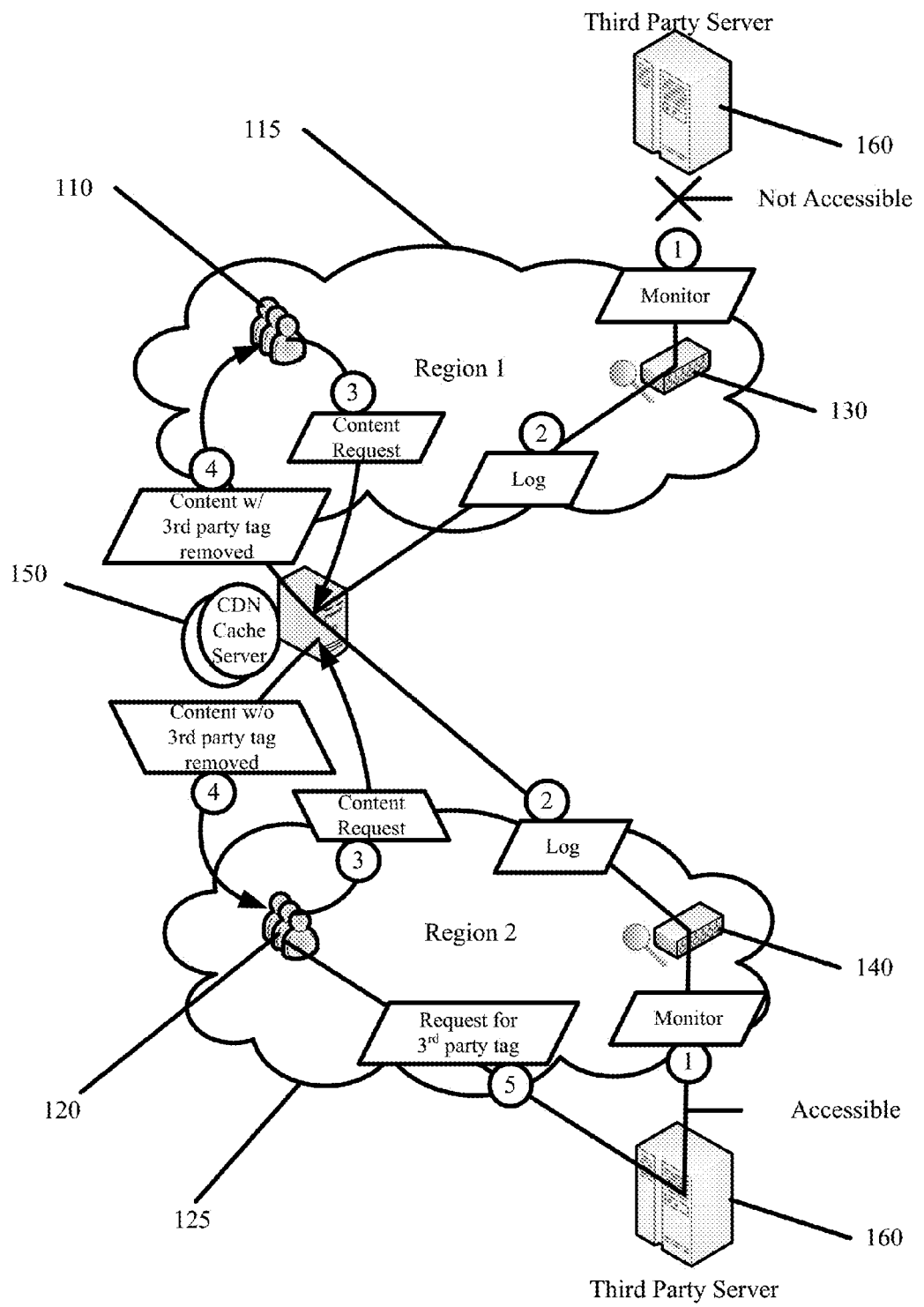
FIG. 1 illustrates one such CDN deployment in accordance with some embodiments.

To detect the unavailable, inaccessible, or poorly performing third-party delivered elements of CDN-customer content, some embodiments modify the CDN deployment to incorporate a set of monitoring agents. FIG. 1 illustrates one such CDN deployment in accordance with some embodiments. The figure illustrates users 110 operating in a first region 115, users 120 operating in a second region 125, a first monitoring agent 130 deployed to and monitoring from the first region 115, a second monitoring agent 140 deployed to and monitoring from the second region 120, CDN caching servers 150 servicing content requests that originate from the first region 115 and the second region 125, and third-party servers 160.

As shown, the monitoring agents 130 and 140 are deployed to different regions 115 and 125 to continually measure content delivery performance as experienced by users in those regions. The deployment of the monitoring agents 130 and 140 can be targeted so as to place an agent in high-traffic regions or in regions in the network that experience high error rates or poor content delivery performance because of poor network infrastructure or regulated network usage resulting from regional, enterprise, or national firewalls. The monitoring agents 130 and 140 can be operated by the CDN. In some such embodiments, the CDN deploys network enabled machines at the desired locations throughout the network. The CDN then configures a process on each machine to perform the monitoring. In some embodiments, the CDN leverages monitoring agents operated by a third-party. These third-party monitoring agents can be configured to periodically report performance measurements back to the CDN thereby operating under control or direction of the CDN.

The monitoring agents 130 and 140 are configured with a list of CDN-customer content elements that are delivered by the third parties 160. The monitoring agents 130 and 140 measure the content delivery performance provided by the third parties 160. In some embodiments, the list of third-party delivered elements of CDN-customer content is targeted to those elements that are most commonly tagged within the CDN-customer content. This can include, for example, the one hundred most frequently accessed elements from the CDN-customer content. As some examples, the monitoring agents 130 and 140 may be configured to monitor the content delivery performance provided for (i) advertisements from a third-party advertising service, (ii) social media feeds or content from various social media service providers (e.g., www.facebook.com, www.twitter.com, etc.), (iii) videos from various video hosting sites (e.g., www.youtube.com), and (iv) analytics, monitoring tools, and other applications from various third-party service providers (e.g., Google Analytics). In some embodiments, an administrative server of the CDN continually reconfigures the list of CDN-customer content elements that the monitoring agents 130 and 140 monitor. This ensures that the monitoring agents 130 and 140 monitor content elements that are relevant to the content being delivered by the CDN caching servers 150. The list can also be appended as new customer content is uploaded to the CDN.

Each monitoring agent 130 and 140 continually monitors the configured list of CDN-customer content elements so as to retain real-time information about the content delivery performance of the third parties 160. The monitoring agents 130 and 140 can perform either a simple or complex monitoring of the configured list of content elements.

The simple monitoring involves a monitoring agent pinging at least one third-party server that delivers one or more elements from the configured list of content elements. The time it takes for the third-party server to respond to the ping, along with the content element being monitored, are recorded to a log. Each monitoring agent 130 and 140 stores and updates one such log based on the measurements taken by that monitoring agent 130 or 140.

The complex monitoring involves a monitoring agent requesting each element of the configured list of configured elements from the appropriate third-party server. The monitoring agent then logs the time it takes for the monitoring agent to receive the requested element from the third-party server. The monitoring agent also logs any errors that occur during or as part of the content element retrieval.

Figure 2:
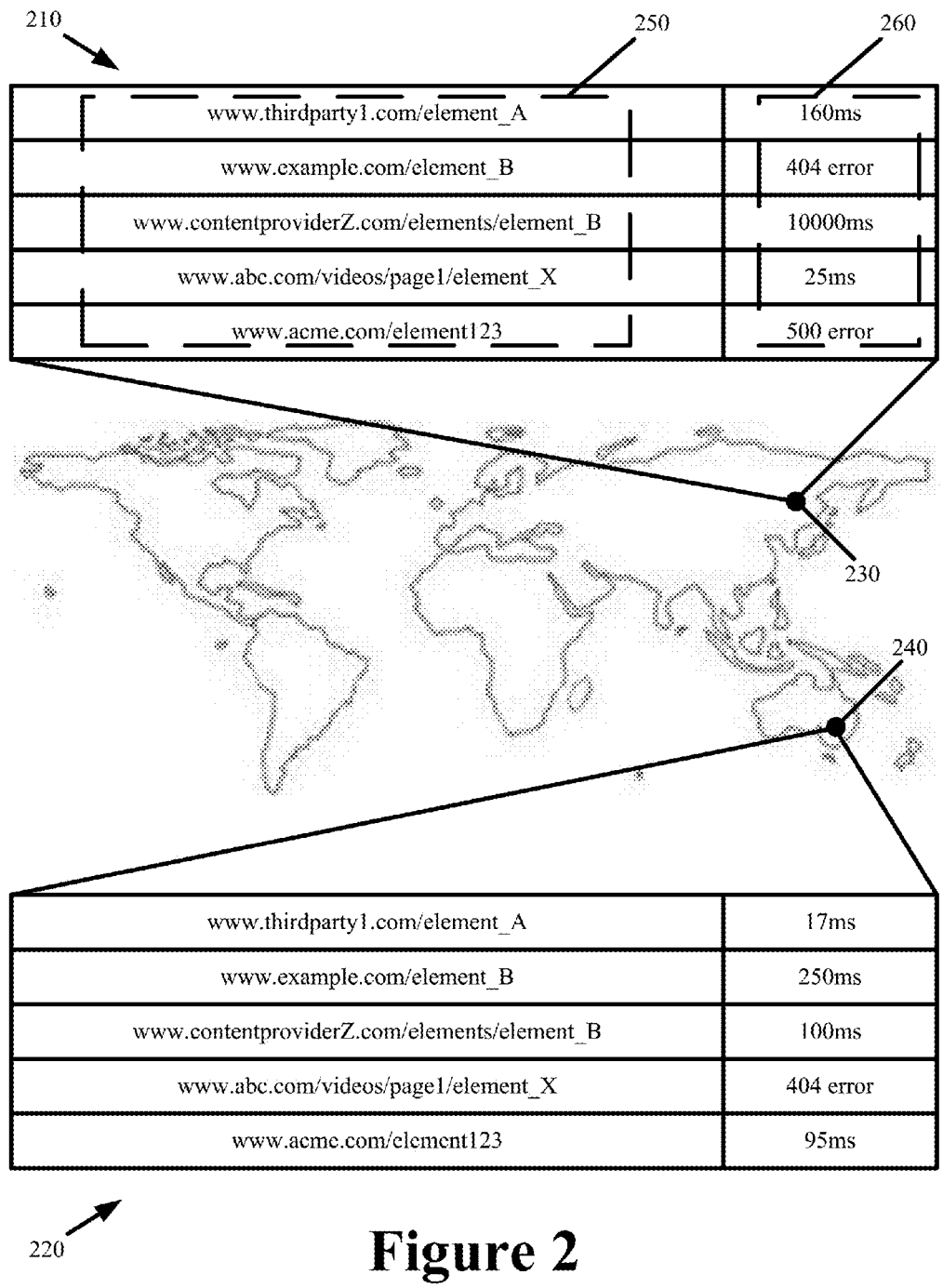
FIG. 2 conceptually illustrates logs of two monitoring agents operating as part of the dynamic CDN tag management solution.

FIG. 2 conceptually illustrates logs 210 and 220 of two monitoring agents operating as part of the dynamic CDN tag management solution. Each monitoring agent monitors the same set of third-party tags from different geographic locations 230 and 240. For instance, the first monitoring agent requests and downloads the third-party tags from a location within Australia while the second monitoring agent requests and downloads the third-party tags from a location within China. Accordingly, the logs 210 and 220 present the same set of tags but with measurements reflective of the delivery performance that the third parties provide to the different regions 230 and 240.

As shown, each log 210 and 220 includes a first column 250 listing URLs that identify the monitored content elements. Each log 210 and 220 also includes a second column 260 listing a performance measurement for the corresponding content element identified in the first column 250. The performance measurement can be a numerical time value or a code representing a detected error or network condition. Additional columns can be provided for different performance metrics. For example, one column tracks the time required to receive a particular content element and another column tracks the number of packets that were retransmitted or lost during the transmission of the particular content element.

With reference back to FIG. 1, the monitoring agents 130 and 140 periodically provide their logs to the CDN caching servers 150. In some embodiments, the monitoring agents 130 and 140 provide their logs to all CDN caching servers. In some other embodiments, the monitoring agents 130 and 140 selectively provide their logs to the CDN points of presence (PoPs) or CDN caching servers that service requests originating from the same or neighboring regions in which one of the monitoring agents 130 and 140 operates. The logs can be provided to the CDN caching servers by communicably coupling the agents 130 and 140 to the CDN caching servers 150 over a network. Using the network connectivity, the logs can be disseminated by using push mechanisms, whereby the monitoring agents 130 and 140 initiate connections to the CDN caching servers 150 and periodically push their logs to the caching servers 150 or by using pull mechanisms, whereby the caching servers 150 initiate connections with the monitoring agents 130 and 140 and periodically pull the logs from the monitoring agents 130 and 140.

The CDN caching servers 150 provide localized content delivery to the users in the different geographic regions. Each of the CDN caching servers 150 may represent a single physical machine or a cluster of machines that delivers content on behalf of different content providers (i.e., CDN customers). The cluster of machines may include a server farm for a geographically proximate set of physically separate machines or a set of virtual machines that execute over partitioned sets of resources of one or more physically separate machines. The CDN caching servers (including CDN caching servers 150) are distributed across different network edges of the Internet to facilitate the "last mile" delivery of content. Each cluster of servers at a particular network edge may represent a PoP of the CDN, wherein a user receives content from a server in the closest PoP.

Figure 3:
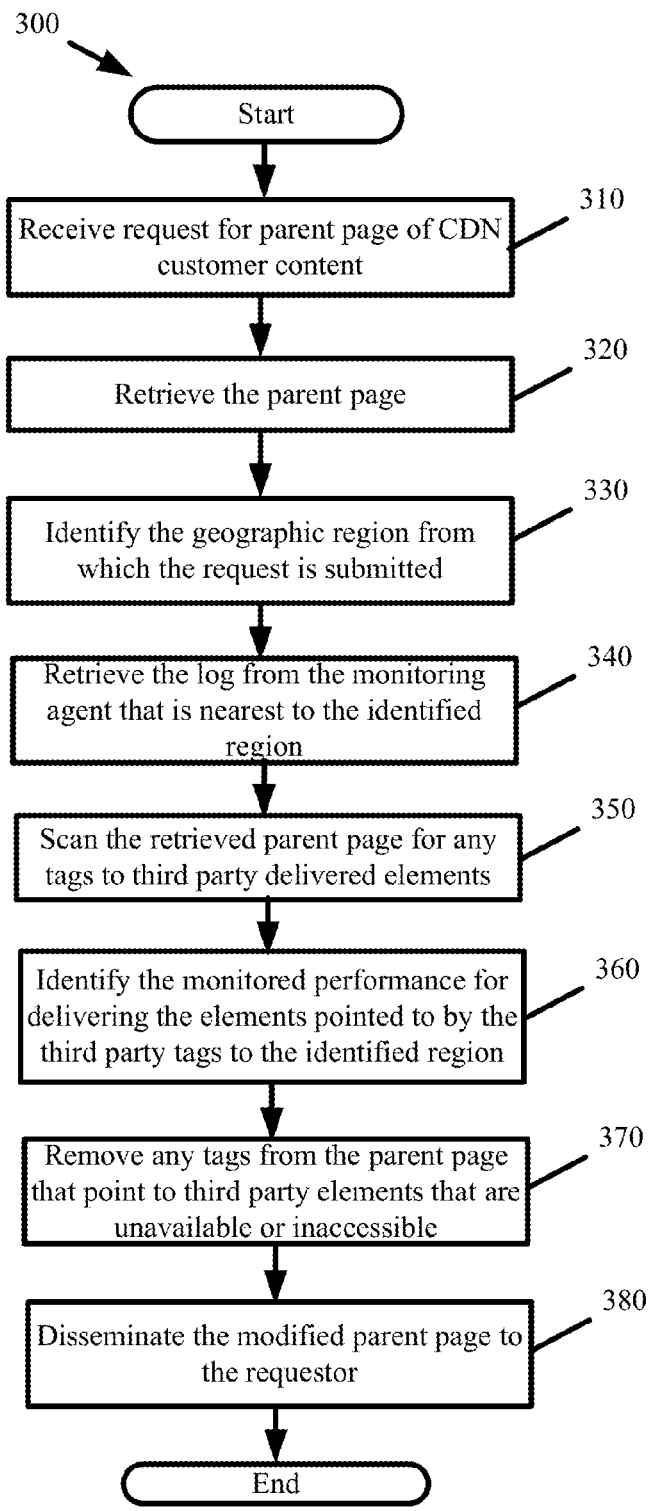
FIG. 3 presents a process by which a CDN caching server performs dynamic tag management in accordance with some embodiments.

In some embodiments, the CDN caching servers 150 use the performance measurements from the logs of the monitoring agents 130 and 140 to facilitate the dynamic CDN tag management. FIG. 3 presents a process 300 by which a CDN caching server performs dynamic CDN tag management in accordance with some embodiments.

Process 300 commences when a CDN caching server receives (at 310) a request for a parent page of CDN-customer content. The request is typically encapsulated as an HTTP GET packet with the packet specifying a URL identifying the parent page. However, the request can be encapsulated in other packets and formats. The request also includes an IP address or other identifier from which a general location of the requesting user can be determined. The user may initiate the request for the parent page by first issuing a DNS query to resolve the CDN customer domain to an IP address. The authoritative DNS server for the CDN customer domain aliases (via a CNAME) the CDN customer domain to the CDN domain such that the DNS query ultimately gets resolved to an IP address of the CDN and the user submits the request for the CDN-customer content to the CDN IP address. Alternatively, a user may request and receive a base page from the CDN customer servers. The base page may reference one or more parent pages (e.g., include files) that are hosted by the CDN. Once the user requests those parent pages from the CDN, the CDN can then dynamically control any tags to third-party delivered elements of CDN-customer content within the parent pages.

In response to the request, the process retrieves (at 320) the parent page. The parent page can be retrieved from the CDN caching server cache. When the parent page is not present in the CDN caching server cache, the process retrieves the parent page from the CDN customer origin server or from another CDN caching server that stores the parent page.

The process also retrieves the monitoring agent log(s) from the monitoring agent that operates in the geographic region that is nearest to the user submitting the request. Retrieving the proper monitoring agent log involves identifying (at 330) the geographic region from which the user submits the request. To do so, the caching server may be configured with an IP address mapping table. The caching server extracts the user's IP address from the packet that encapsulates the request. A lookup of the user's IP address is then made to the mapping table to identify the region in which the user operates. The caching server then retrieves (at 340) the log from the monitoring agent that operates in or nearest to the identified region for the user. In some embodiments, other identifiers (e.g., autonomous system number) in addition to or instead of the user's IP address are used to identify the user's location. In some embodiments, a traceroute is performed to identify the user location.

Next, the process scans (at 350) the retrieved parent page for any tags to third-party delivered elements. This is a simple determination for the CDN caching server as the domain names that are specified for the third-party tags will differ from those that are specified for the tags pointing to CDN hosted content elements. Alternatively, the CDN caching server can be configured with a specific list of tags that are being monitored. In such cases, the CDN caching server searches the parent page to see if any of the tags therein match with any tag in the list of tags being monitored.

FIG. 4 presents various code snippets to different elements of CDN-customer content specified in a parent page. As shown, the CDN-customer content elements specified in section 410 are delivered by servers of a CDN as identified by the common domain name specified for each element in section 410. However, CDN-customer content elements 420, 430, and 440 are delivered from three different third parties, as identified by the differing domain names. A content provider may insert tags to these third-party elements for various reasons. Some reasons include the inability of the CDN servers to cache the third-party content when it is dynamically generated by the third parties, when the third-party provides the content provider with a particular service that is not offered by the CDN (e.g., advertising, statistical tracking, security, etc.), or when a two way communication is needed between the third-party and a user.

With reference back to FIG. 3, the process identifies (at 360) the monitored performance for any tags to the third-party delivered elements within the parent page. The monitored performance is identified from the retrieved monitoring agent logs, wherein the retrieved logs track the performance for delivering the elements pointed to by the third-party tags to the geographic region in which the requesting user is located. The identification at step 360 can be performed by matching the tag's URL with the content element URL in the monitoring agent logs. In some embodiments, the identification at step 360 is performed using hashing. In some such embodiments, the process hashes a third-party tag with the hash result pointing to a logged performance measurement in a monitoring agent log.

For any third-party delivered element of CDN-customer content that is reported in the logs to be unavailable, inaccessible, or underperforming, the process removes (at 370) the tag corresponding to that element from the parent page. Unavailable or inaccessible elements can be identified from performance measurements specifying an error code for that element. Underperforming elements can be identified from performance measurements that exceed some performance threshold (e.g., greater than five seconds to deliver an element).

The process then disseminates (at 380) the dynamically modified parent page to the requesting user. Once the user receives the dynamically modified parent page, the user will begin to load the content specified therein by requesting the tags that have not been removed.

Figure 5:
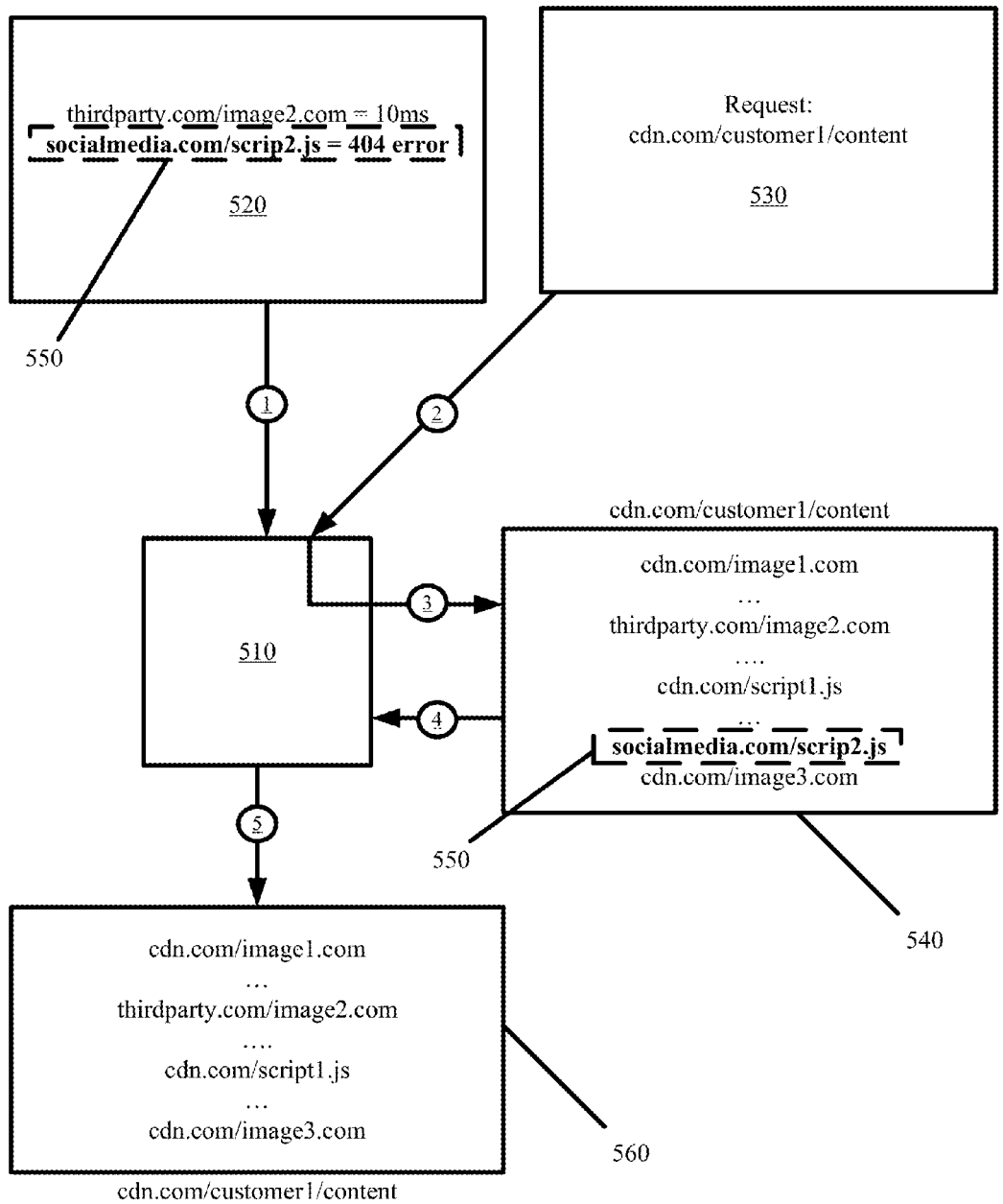
FIG. 5 conceptually illustrates the dynamic CDN tag management performed by a CDN caching server in accordance with some embodiments.

FIG. 5 conceptually illustrates the dynamic CDN tag management performed by a CDN caching server in accordance with some embodiments. The figure illustrates a CDN caching server 510 receiving a monitoring agent log 520 and a request 530 for CDN-customer content. The CDN caching server 510 caches an unmodified parent page 540 for the requested CDN-customer content. Using the monitoring agent log 520, the CDN caching server 510 identifies the performance that is monitored for each tag to a third-party delivered element of CDN-customer content. In this figure, the monitoring agent log 520 identifies that CDN-customer content element 550 is currently unavailable. Accordingly, the CDN caching server 510 modifies the parent page 540 by removing the tag to the unavailable third-party content element before sending the modified parent page 560 to the requesting user.

Figure 6:
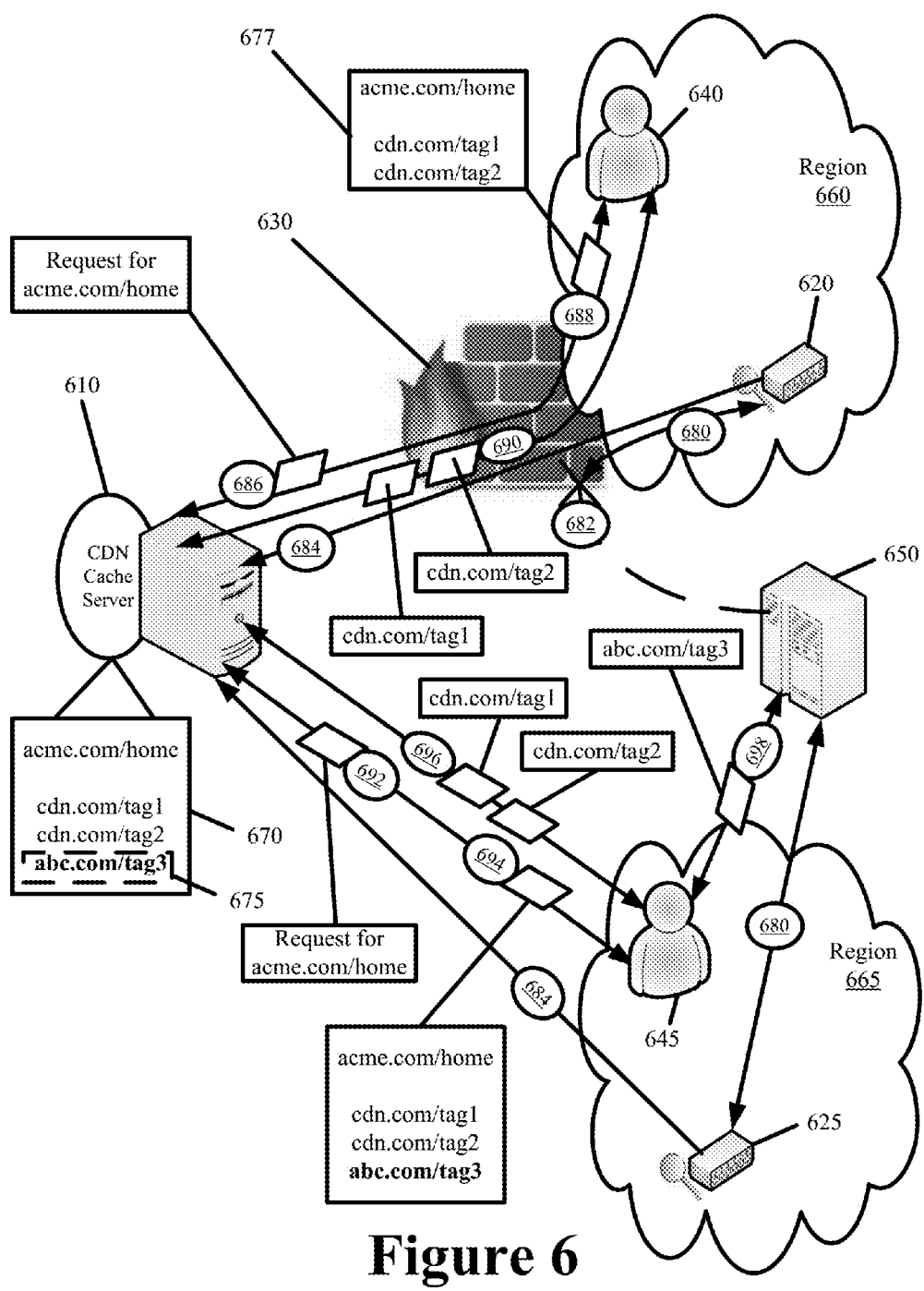
FIG. 6 provides a more detailed illustration for the dynamic CDN tag management performed by a CDN caching server in accordance with some embodiments.

FIG. 6 provides a more detailed illustration for the dynamic CDN tag management performed by a CDN caching server in accordance with some embodiments. The figure illustrates a CDN caching server 610, monitoring agent 620, monitoring agent 625, firewall 630, user 640, user 645, and third-party server 650. The monitoring agent 620 and the user 640 are located in region 660. The firewall 630 restricts the content that enters and exits the region 660. The monitoring agent 625 and the user 645 are located in region 665. Region 665 is not subject to any firewall content restrictions.

The CDN caching server 610 caches a parent page 670 that includes tags to three different content elements. Two of the three content elements are cached and delivered by the CDN caching server 610. However, the third content element 675 is not cached by the CDN caching server 610 and is instead hosted and delivered by the third-party server 650.

The monitoring agents 620 and 625 each monitor the performance with which the third-party server 650 delivers the third content element 675 to the respective region in which the monitoring agent 620 or 625 is located. To do so, each monitoring agent 620 and 625 submits (at 680) a request that is directed to the third-party server 650 for the third content element 675. As shown, the firewall 630 prevents (at 682) the request submitted by monitoring agent 620 from reaching the third-party server 650 because the firewall 630 is configured with a policy that restricts content from the third-party server 650. Accordingly, the monitoring agent 620 waits until its request times out before logging that the third content element 675 is unavailable in region 660. The monitoring agent 625 however, is able to successfully request and receive the third content element 675 from the third-party server 650. The third-party server's 650 content delivery performance is then logged by the monitoring agent 625. The monitoring agents 620 and 625 then provide (at 684) their logs to the CDN caching server 610.

When the CDN caching server 610 receives (at 686) a request for the parent page 670 from user 640 in region 660, the CDN caching server 610 optimizes the parent page 670 according to the log of the monitoring agent 620 operating in region 660. Specifically, the CDN caching server 610 retrieves the requested parent page 670 and analyzes the tags to identify that one of them 675 is directed to a CDN-customer content element that is delivered by the third-party server 650. The CDN caching server 610 then retrieves the monitoring agent 620 log that measures performance from the region 660 in which the user 640 request originates.

Using the logged performance measurements for region 660, the CDN caching server 610 determines that the third CDN-customer content element 675 is unavailable in that region 660 and the CDN caching server 610 therefore modifies the parent page 670 to remove the tag to the third-party delivered content element 675. The CDN caching server 610 passes (at 688) the modified parent page 677 to the user 640. The user 640 then issues (at 690) requests for the CDN-customer content elements listed in the modified parent page 677 which does not include the tag to the third-party delivered content element 675. In this case, the user 640 will not receive a full rendering of the CDN-customer content as the CDN caching server 610 will deliver two of three CDN-customer content elements to the user 640 while the blocked CDN-customer content element of the third-party server 660 is omitted. In so doing, the user 640 receives the deliverable content elements without delay while avoiding the delay associated with the unavailable content element 675. The user 640 is thus spared from the significant delay of having to wait for the request to the blocked CDN-customer content element 675 to time out before the content is completely rendered on his machine.

When the CDN caching server 610 receives (at 692) a request for the parent page 670 from user 645 in region 655, the CDN caching server 610 optimizes the parent page 670 according to the performance measurement from the log of the monitoring agent 625 operating in region 665. In this case, the CDN caching server retrieves the requested parent page 670 and analyzes the tags to identify that one of them 675 is directed to a CDN-customer content element that is delivered by the third-party server 650. The CDN caching server 610 then retrieves the monitoring agent 625 log that measures performance from the region 665 in which the user 645 request originates.

Using the logged performance measurements for region 665, the CDN caching server 610 determines that the third CDN-customer content element 675 is available in region 665 and the CDN caching server 610 therefore does not modify the parent page 670. The CDN caching server 610 passes (at 694) the unmodified parent page 670 to the user 640. The user 645 then issues requests for the individual CDN-customer content elements. The CDN caching server 610 delivers (at 696) two of three CDN-customer content elements and the third-party server 660 delivers (at 698) the third CDN-customer content element.

The above implementations provide a decentralized framework for the dynamic tag management solution. However, this implementation introduces redundant processing as each CDN caching server is responsible for generating the modified parent pages. Accordingly, two different CDN caching servers may each process the same unmodified parent page in order to produce the same modified parent page. To avoid this redundancy and reduce the load placed on the CDN caching servers, some embodiments provide a centralized framework for the dynamic tag management solution.

Figure 7:
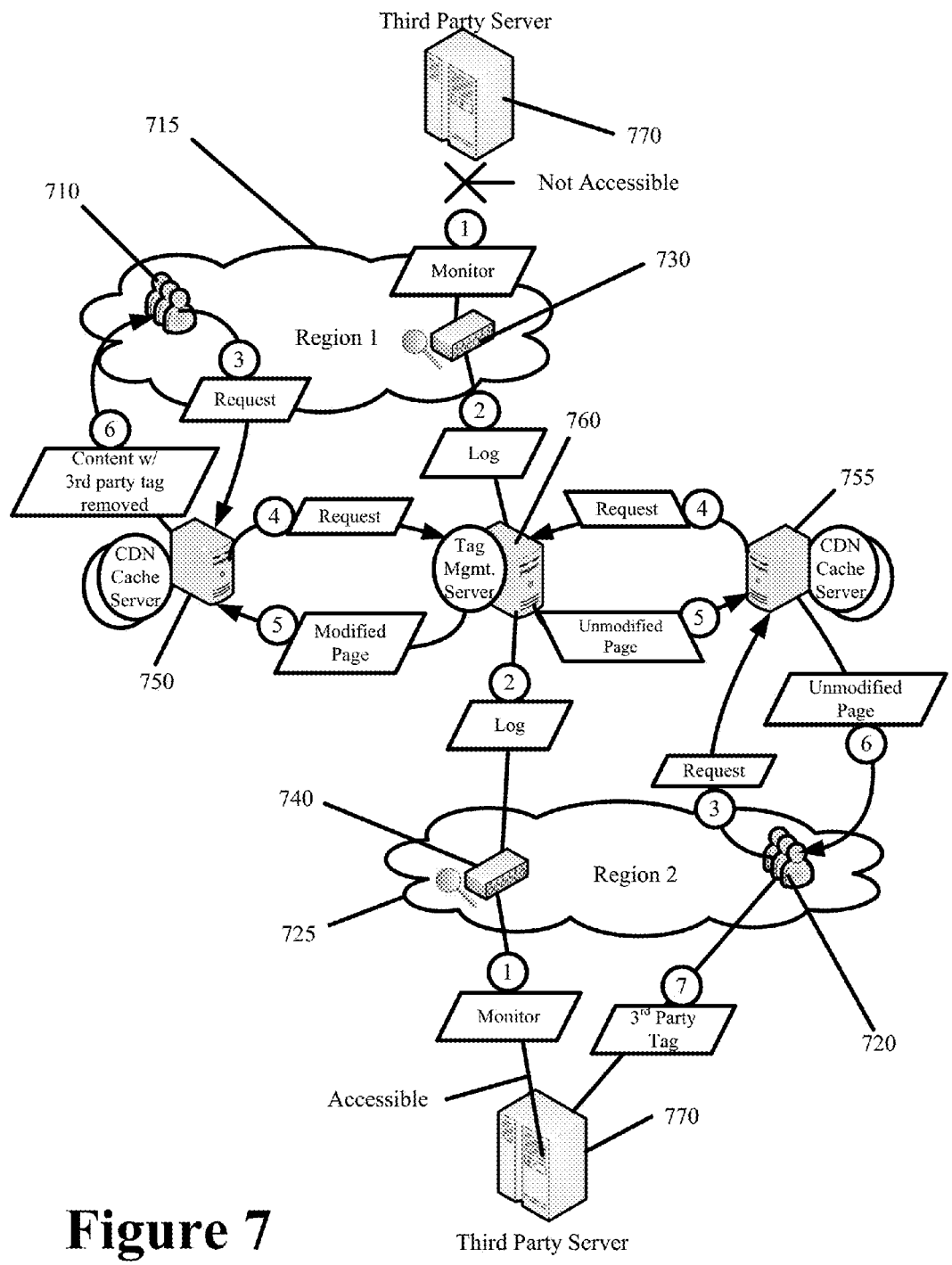
FIG. 7 illustrates a centralized framework for the dynamic CDN tag management solution in accordance with some embodiments.

FIG. 7 illustrates a centralized framework for the dynamic CDN tag management solution in accordance with some embodiments. The figure illustrates users 710 operating in a first region 715, users 720 operating in a second region 725, a first monitoring agent 730 deployed to and monitoring from the first region 715, a second monitoring agent 740 deployed to and monitoring from the second region 725, CDN caching servers 750 servicing content requests that originate from the first region 715, CDN caching servers 755 servicing content requests that originate from the second region 725, tag management server 760, and third-party servers 770.

As in the decentralized framework of FIG. 1, the monitoring agents 730 and 740 are deployed to different regions 715 and 725 to continually measure content delivery performance as experienced by users in those regions 715 and 725. In FIG. 7, the monitoring agents 730 and 740 monitor and record content delivery performance for one or more CDN-customer content elements that are delivered by the third parties 770. However unlike the decentralized framework whereby the monitoring agents provide their performance measurement logs to the CDN caching servers, in the centralized framework of FIG. 7, the monitoring agents 730 and 740 provide their logs to the tag management server 760. Accordingly, the tag management server 760 serves as a central repository for the performance measurements reported by the monitoring agents 730 and 740. Though only one tag management server 760 is depicted, it is possible to deploy two or more tag management servers and maintain the centralized framework. In such instances, each tag management server serves as the repository for logs of a different group of monitoring agents. Alternatively, one or more tag management servers can be configured as redundant backups for a master tag management server.

In some embodiments, the tag management server 760 also caches the unmodified parent pages for CDN-customer content that include tags to third-party delivered elements of CDN-customer content. Using the monitoring agent 730 and 740 logs, the tag management server 760 produces a first modified parent page that is optimized for delivery to region 715 and a second modified parent page that is optimized for delivered to region 725. The tag management server 760 can generate the modified parent pages on-the-fly in response to requests received from the CDN caching servers or the tag management server 760 can pre-generate the modified parent pages upon receiving the monitoring agent logs and prior to receiving any requests from the CDN caching servers. As before, each produced modified parent page is associated with one or more regions and is disseminated in response to requests for the parent page that originate from those one or more regions. To differentiate the different modified parent pages, the tag management server may name the modified parent pages differently. For example, an unmodified parent page named "parent.js" can produce page "parent_cn.js" that is modified for delivery in China, "parent_au.js" that is modified for delivery in Australia, and "parent_fr.js" that is modified for delivery in France. The tag management server 760 stores the modified parent pages, disseminates them to the CDN caching servers 750 and 755 according to where the requests originate, and updates them when the logs from the monitoring agents 730 and 740 report a change in the status for a third-party delivered element of CDN-customer content.

FIG. 7 illustrates CDN caching server 750 receiving a request for a parent page of CDN-customer content from user 710 operating in region 715. The CDN caching server 750 then submits a request to the tag management server 760 for a modified instance of the requested parent page. The CDN caching server 750 request may identify the requested parent page and include an identifier (e.g., IP address) from which the user's location can be determined. Alternatively, the CDN caching server 750 may be configured with a set of rules that determine a specific modified parent page to request form the tag management server 760 based on the region from which the user submits the request.

Based on the monitoring agent 730 log, the tag management server 760 identifies that the requested parent page includes a child tag to a third-party delivered element of CDN-customer content that is inaccessible in region 715. Accordingly, when producing the modified instance of the requested parent page, the tag management server 760 removes the tag to the inaccessible third-party delivered element of CDN-customer content. The tag management server 760 passes the modified parent page to the CDN caching server 750 in response to the CDN caching server's request. The CDN caching server 750 then serves the modified parent page to the user 710. The CDN caching server 750 may optionally cache the modified parent page.

Figure 8:
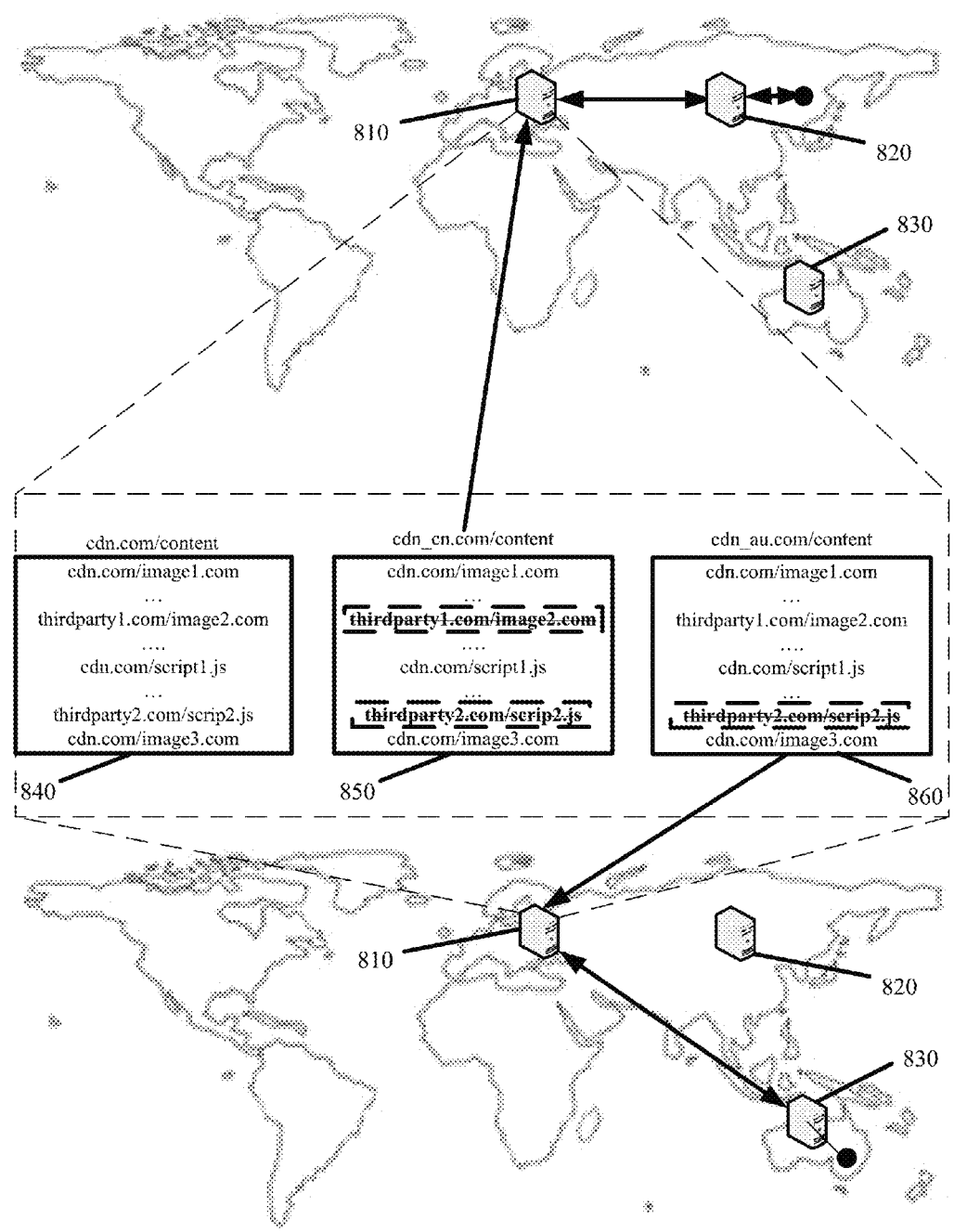
FIG. 8 conceptually illustrates the dynamic tag management performed by the CDN tag management server on behalf of the CDN caching servers in accordance with some embodiments.

FIG. 8 conceptually illustrates the dynamic tag management performed by the CDN tag management server on behalf of the CDN caching servers in accordance with some embodiments. The figure illustrates tag management server 810 and CDN caching servers 820 and 830 operating in different regions. The tag management server 810 stores an unmodified parent page 840, a first modified instance of the parent page 850 that is optimized for delivery to a first region, and a second modified instance of the parent page 860 that is optimized for delivery to a second region. As shown, the unmodified parent page 840 includes five tags with three tags identifying CDN delivered content elements and two tags identifying third-party delivered elements of CDN-customer content. The first modified parent page 850 excludes the two tags to the third-party delivered elements of CDN-customer that the tag management server 810 has determined to be unavailable, inaccessible, or underperforming when delivered by the hosting third-party servers to the first region. The second modified parent page 860 excludes one tag to a third-party delivered element of CDN-customer content that the tag management server 810 has determined to be unavailable, inaccessible, or underperforming when delivered by the hosting third-party server to the second region.

As shown at the top of the figure, a user operating in the first region requests the parent page from CDN caching server 820. Based on a configured set of rules, the CDN caching server 820 determines the first modified instance of the parent page 850 is optimized for delivery to the user in the first region. For example, a rule may specify appending "_cn" to the requested parent page name if the user's IP address is 221.172.X.X (a Chinese IP address block) and appending "_au" to the requested parent page name if the user's IP address is 1.40.X.X (an Australian IP address block) in order to identify the modified parent page that is optimized for each of those regions. Based on the lookup, the CDN caching server 820 requests the first modified parent page 850 from the tag management server 810. The tag management server 810 responds by retrieving and passing the first modified parent page 850 to the CDN caching server 820. The CDN caching server 820 then delivers the first modified parent page 850 to the user. The user submits requests for each of the three remaining tags in the first modified parent page 850 without requesting the two removed tags to the blocked third-party delivered elements of CDN-customer content. As such, the user receives a redacted version of the overall content, wherein the redactions improve the user experience by saving the user from having to unnecessarily request and wait for the blocked third-party content elements that are unavailable, inaccessible, or underperforming in the user's region. This can save several seconds in the overall rendering of the content with little to no loss in actual content that is viewable by the user in the first region.

As shown at the bottom of the figure, a user operating in the second region requests the parent page from CDN caching server 830. Based on a configured set of rules, the CDN caching server 830 determines the second modified instance of the parent page 860 is optimized for delivery to the user in the second region. Accordingly, the CDN caching server 830 requests the second modified parent page 860 from the tag management server 810. The tag management server 810 responds by retrieving and passing the second modified parent page 860 to the CDN caching server 830. The CDN caching server 830 then delivers the second modified parent page 860 to the user. In this example, the user is spared from unnecessarily requesting one tag to an unavailable, inaccessible, or underperforming third-party content element.

Figure 9:
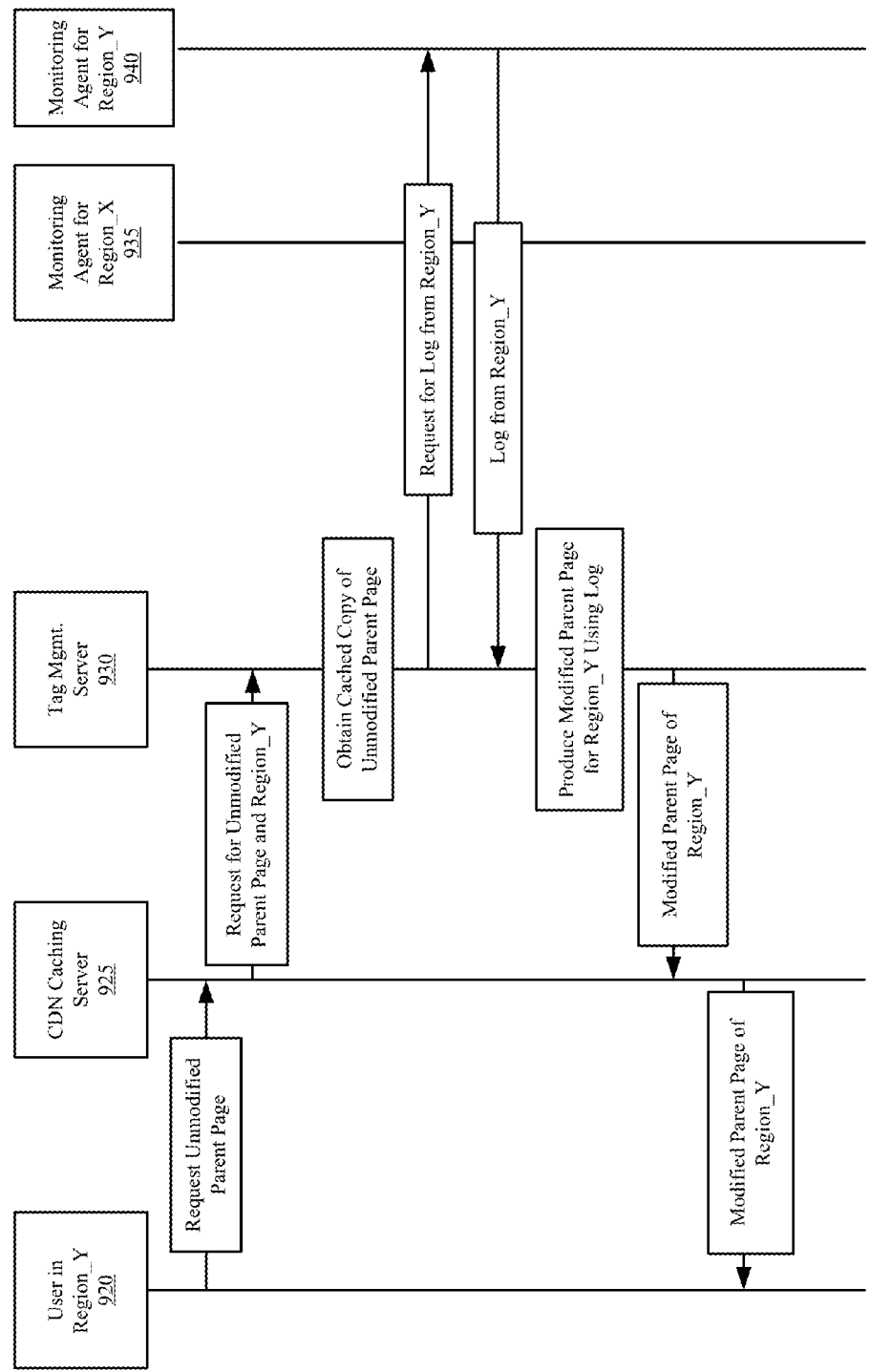
FIG. 9 illustrates a variation to the centralized dynamic CDN tag management solution in accordance with some embodiments.

FIG. 9 illustrates a variation to the centralized dynamic CDN tag management solution in accordance with some embodiments. The figure illustrates a message exchange between a user 920, CDN caching server 925, tag management server 930, and monitoring agents 935 and 940.

The message exchange begins with the user 920 submitting a request for a parent page to the CDN caching server 925. The CDN caching server 925 then queries the tag management server 930 for a modified instance of the requested parent page by providing the tag management server 930 with a first identifier (e.g., URL) identifying the parent page and a second identifier (e.g., IP address) identifying the region from which the user 920 originates the request. In this message exchange, the tag management server 930 produces the modified parent page on-the-fly by retrieving a cached instance of the unmodified parent page and the log from the monitoring agent 940 that operates in or near the region in which the user 920 operates. As shown, the tag management server 930 requests the log from the monitoring server 940 in response to the CDN caching server's query. The tag management server 930 parses the unmodified parent page to identify tags to any third-party delivered elements of CDN-customer content. The tag management server 930 then identifies the third-party performance in delivering those content elements to the region from which the user submits the initial request and produces the modified parent page by removing any tags to content elements that the third parties are unable to deliver or deliver with poor performance the user region. The tag management server 930 passes the modified parent page to the CDN caching server 925 and the CDN caching server 925 forwards the modified parent page to the user 920.

In some embodiments, the tag management server operates as a reverse proxy. In such instances, the tag management server receives a request for a parent page. The tag management server then retrieves the tags associated with that page dynamically from a CDN-customer origin and modifies the page based on the measurements obtained for those elements from the monitoring agent logs.

In any centralized framework, the CDN caching servers may cache the modified parent pages that are received from the tag management server. This allows the CDN caching servers to respond to subsequent requests for the same parent pages that originate from the same region without issuing another request to the tag management server.

In some embodiments, the modified parent pages are specified with a time-to-live (TTL) parameter. The CDN caching servers are permitted to cache the modified parent pages for the specified TTL. Upon expiration of the TTL, the CDN caching server may simply purge the page. Alternatively, upon expiration of the TTL, the CDN caching server may check the tag management server to determine if the modified parent page has changed. If not, the CDN caching server retains its local copy of the modified parent page and resets the TTL parameter for that cached page. Otherwise, the CDN caching server removes the local copy of the modified parent page and optionally, caches the updated copy of the modified parent page from the tag management server.

Some embodiments enable the tag management server control over the CDN caching servers' caching of the modified parent pages. In some such embodiments, the tag management server issues commands to the CDN caching servers for when the CDN caching servers are to remove or replace a cached instance of a modified parent page. In so doing, the tag management server can ensure that the CDN caching servers have the most recent instance of a modified parent page. Specifically, when the tag management server receives an updated log from one or more monitoring agents that indicate a status change affecting a child tag to a third-party delivered content element within a previously generated modified parent page, the tag management server can immediately produce the updated instance of the modified parent page. The tag management server can also issue a command to the CDN caching servers to cause the servers to purge the previous instance of the modified parent page. A CDN caching server can then immediately update its cache by retrieving the updated instance for that modified parent page from the tag management server. Alternatively, the CDN caching server can retrieve the updated instance for the modified parent page from the tag management server when that particular modified parent page is next requested from the CDN caching server.

In some embodiments, the dynamic CDN tag management functionality is enabled without any action on the part of the CDN-customer content. The CDN customer registers with the CDN and provides its content to the CDN. The CDN analyzes the content to identify and monitor any tags to third-party hosted elements of the CDN-customer content. When that CDN-customer content is requested, the CDN retrieves monitoring results for the third-party hosted elements of such content. Using the monitoring results, the CDN (e.g., CDN caching servers or tag management server) decides whether to retain or remove tags to those elements from a parent page before sending the parent page to the requesting user.

In some other embodiments, a CDN customer specifically opts for the dynamic CDN tag management functionality by inserting a CDN tag into the CDN-customer content. The CDN specific tag is then called whenever the CDN-customer content is requested. In some embodiments, the CDN specific tag invokes a script. The script identifies the region from which the requesting user submits the request and calls a specific subscript based on the identified region.

The subscript retrieves the appropriate one or more monitoring agent logs that contain the performance measurements of third-party hosted content elements to the user's region. For example, a first subscript is invoked to retrieve logs from one or more monitoring agents operating in China when the user submits a request from a region within China and a second subscript is invoked to retrieve logs from one or more monitoring agents operating in North America when the user submits a request from a region within North America.

The subscript also includes the code for determining whether to retain or remove a tag to a third-party content element based on the results from the retrieved logs. This code may specify what is considered an acceptable delivery time to retain a tag that calls a third-party hosted content element. For example, the subscript may remove a tag to any third-party hosted content element that is monitored to take more than five seconds to deliver. Alternatively, the subscript may remove a tag to any third-party hosted content element that is undeliverable as identified by HTTP 404 and other undeliverable error codes.

In some embodiments, the subscript can also be used to substitute the content for a third-party hosted element with alternative content. Therefore, rather than remove a tag entirely, the CDN can replace the primary content that is specified for a tag with secondary content. For example, if a CDN customer monetizes its content through advertisements and the monitoring agent logs identify that a tag to a first advertising server is unavailable, the CDN caching server can replace that tag rather than altogether remove it. Specifically, the CDN caching server can replace the tag such that the replacement tag calls and retrieves a different advertisement from a second advertising server that is confirmed to be available from the monitoring agent logs in the requesting user's region. As another example, CDN-customer content may include a tag that statically retrieves third-party hosted elements of CDN-customer content from the same third-party server, even though other third-party servers may have other servers available. When the statically pointed to third-party server is down or is significantly underperforming in the requesting user's region, the subscript can replace the tag so that a call is made to a different third-party server that provides better performance as determined from the monitoring agent logs.

The replacement tag or substitute content can be specified as part of the subscript or CDN specific tag. In such cases, the subscript contains a condition that retains the content provider's original tag when the requesting user is from a first region and that replaces the original tag with a substitute tag to alternate content when the requesting is from a second region that is better serviced with the alternative content.

The CDN specific tag also enables the CDN to better optimize CDN-customer content. One such optimization involves specifying the tags to the third-party hosted element of CDN-customer content as non-blocking tags. As is known to one of ordinary skill in the art, a tag can be specified as blocking or non-blocking. A tag that is specified to be blocking prevents a user from calling other tags specified as part of the CDN-customer content until the blocking tag is completely received, times out, or is determined to be inaccessible. Accordingly, blocking tags are called serially and not in parallel. Conversely, a user can call tags that are specified to be non-blocking in parallel with other non-blocking tags. For example, a non-blocking tag can be specified in HTML5 by introducing the "async" attribute in the "<script>" tag. Non-blocking tags allow the user to call and retrieve multiple content elements in parallel even though the processing of the content elements associated with the non-blocking tags is performed serially. In any regard, downloading the content elements is the most time consuming step for a user, with the processing adding only insignificant delay to the rendering of content on the user's machine. Therefore, by introducing the CDN specific script or tag into the CDN-customer content, the CDN specific tag can be used to override and call each of the embedded tags within the CDN-customer content in a non-blocking manner.

Some embodiments further provide a portal to inform CDN customers of the performance of their content in various geographic regions. To do so, the monitoring agent logs are aggregated to a CDN central server. The CDN central server then compiles the performance measurements taken for various third-party tags of CDN-customer content from different geographic regions. When the CDN customer logs in to the portal, the performance measurements that are then pertinent to that CDN customer's content are retrieved from the CDN central server and presented in a graphical user interface. In this manner, the CDN customer is informed of various content elements that may be available in the CDN customer's region, but are unavailable in other regions because of firewalls or other network conditions. The CDN customer can then optimize its content so as to avoid delays associated with the inability to deliver the unavailable CDN-customer content elements in the identified regions.

The dynamic CDN tag management solution and many of the above-described processes are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. More specifically, when the instructions are executed, they transform a computer system with general computing resources into a specialized system that dynamically manages CDN-customer tags in the manners described above.

Server, computer system, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, a cluster of multiple physical machines performing related functions, virtualized servers co-resident on a single physical machine, or various combinations of the above.

Figure 10:
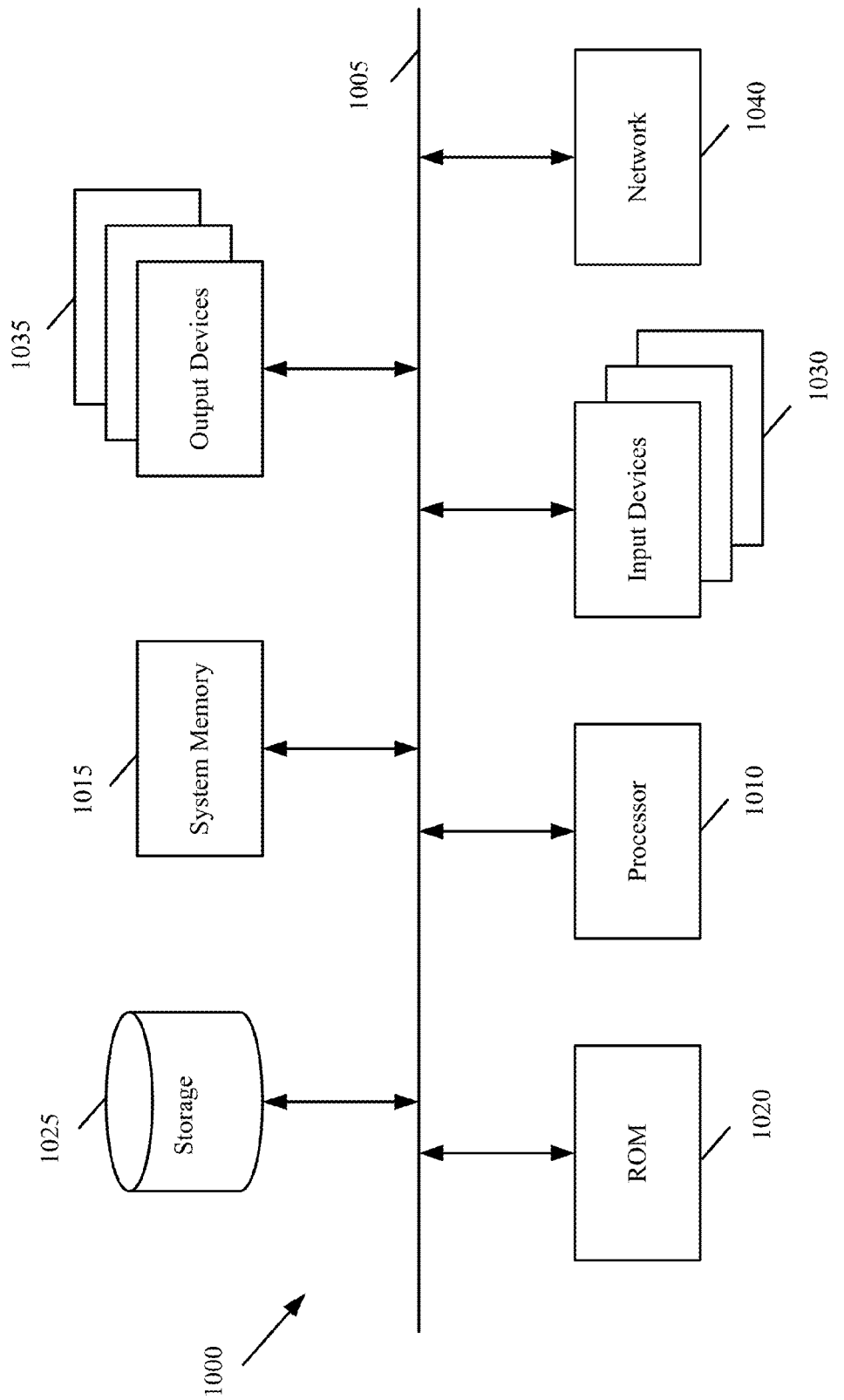
FIG. 10 illustrates a computer system or server with which some embodiments of the file system are implemented.

FIG. 10 illustrates a computer system or server with which some embodiments of the file system are implemented. Such a computer system includes various types of non-transitory computer readable media and interfaces for various other types of computer-readable media that implement the processes for the dynamic CDN tag management solution. Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or solid state disk) as the permanent storage device 1025.

Other embodiments use a removable storage device (such as a flash drive) as the permanent storage device Like the permanent storage device 1025, the system memory 1015 is a read-and-write memory device. However, unlike the storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include, but are not limited to, alphanumeric keypads (including physical keyboards and touchscreen keyboards) and pointing devices (also called "cursor control devices"). The input devices 1030 also include audio input devices (e.g., microphones, MIDI musical instruments, etc.). The output devices 1035 display images generated by the computer system. The output devices include, but are not limited to, printers and display devices, such as liquid crystal displays (LCD).

Finally, as shown in FIG. 10, bus 1005 also couples computer 1000 to a network 1040 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1000 may include one or more of a variety of different non-transitory computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
    hosting in memory of a particular content caching server, a base page comprising a plurality of tags linking to a plurality of content served from different network accessible machines of a plurality of third party content providers;
    tracking at the particular content caching server, content delivery performance from the different network accessible machines of the plurality of third party content providers over a digital network to a plurality of geographic regions;
    optimizing at the particular content caching server, the base page for distribution to each of the plurality of geographic regions, wherein said optimizing comprises generating in said memory of the particular content caching server, a first variation of the base page without a first tag from the plurality of tags in response to the content delivery performance from a network accessible machine of a first content provider of the plurality of third party content providers over the digital network to a first geographic region of the plurality of geographic regions not satisfying a threshold, and generating in said memory of the content caching server, a second variation of the base page without a second tag from the plurality of tags in response to the content delivery performance from a network accessible machine of a different second content provider of the plurality of third party content providers over the digital network to a different second geographic region of the plurality of geographic regions not satisfying the threshold; and
    sending the second variation of the base page without the second tag from the particular content caching server over the digital network to a user operating in the second geographic region.

2. The method of claim 1 further comprising receiving a request directed to a first name associated with the base page from a user operating in the first geographic region.

3. The method of claim 2 further comprising redirecting the request from the first name to a different second name associated with the first variation of the base page based on the user operating in the first geographic region.

4. The method of claim 2 further comprising sending the first variation of the base page instead of the base page from the particular content caching server over the digital network to the user in response to the user operating in the first geographic region.

5. The method of claim 1, wherein said tracking comprises submitting a content request to the network accessible machine of each content provider of the plurality of third party content providers from within each geographic region of the plurality of geographic regions and monitoring response times from the network accessible machine of each content provider of the plurality of content providers.

6. The method of claim 1, wherein said tracking comprises pinging the network accessible machine of each content provider of the plurality of third party content providers from within each geographic region of the plurality of geographic regions and monitoring a response time from the network accessible machine of each content provider of the plurality of third party content providers.

7. The method of claim 1, wherein generating the first variation comprises removing the second tag from the first variation of the base page in response to the content delivery performance from the network accessible machine of the second content provider to the first geographic region not satisfying the threshold during a first time, and reintroducing the second tag to the first variation of the base page in response to the content delivery performance from the network accessible machine of the second content provider to the first geographic region satisfying the threshold during a second time following the first time.

8. A method comprising:
    detecting by a particular content caching server, content delivery performance from a third party content provider over a digital network to a particular Internet Protocol (IP) address block not satisfying a performance threshold;
    receiving at the particular content caching server, a request from a user with an IP address within the particular IP address block, said request for source content formed from a plurality of elements;
    hosting in memory of the particular content caching server, said source content comprising the plurality of elements;
    identifying by the particular content caching server, at least one element of the plurality of elements that is provided by said third party content provider;
    optimizing the source content for distribution to the particular IP address block, wherein said optimizing comprises producing modified content from said source content in said memory of the particular content caching server by removing the at least one element provided by said third party content provider and by retaining a remaining subset of the plurality of elements in response to the content delivery performance from the third party content provider to the particular IP address block not satisfying said performance threshold; and
    sending the modified content comprising the subset of the plurality of elements without the at least one element provided by said third party content provider from the particular content caching server over said digital network to said user in response to the request for the source content.

9. The method of claim 8 further comprising receiving a second request from a user with an IP address outside the particular IP address block, said second request directed to the source content.

10. The method of claim 9 further comprising providing the source content in response to the second request.

11. The method of claim 8, wherein the third party content provider is a first content provider, the method further comprising detecting content delivery performance from a different second content provider to the particular IP address block satisfying the performance threshold.

12. The method of claim 11, wherein producing the modified content comprises replacing the at least one element provided by the first content provider with a substitute element provided by the second content provider, and wherein the subset of elements includes said substitute element.

13. The method of claim 8 further comprising modifying a Uniform Resource Locator (URL) of the request from requesting a first page to requesting a different second page, wherein the first page comprises a plurality of links embedding the plurality of elements as part of the source content, and wherein the second page comprises a subset of the plurality of links omitting a particular link from the plurality of links embedding the at least one element provided by the third party content provider.

14. The method of claim 13 further comprising sending the second page as a result of said modifying.

15. A system comprising:
   a monitoring agent deployed within a geographic region, said monitoring agent comprising memory, a processor, and a network interface collectively monitoring content delivery performance over a digital network into said geographic region by a plurality of third-party servers located outside the geographic region; and
   a caching server comprising memory and a processor, the memory storing a page comprising a set of links embedding in a final rendering of said page, first content delivered by a first third-party server of the plurality of third-party servers, and wherein said processor optimizes the page in response to a request originating from a user within the geographic region, wherein optimizing the page comprises:
   (i) obtaining said content delivery performance from the monitoring agent;
   (ii) removing a particular link of the set of links from the page based on the particular link embedding the first content delivered by the first third-party server and the content delivery performance by the first third-party server into the geographic region is below an acceptable threshold; and
   (iii) serving over the digital network to a device of said user operating from within the geographic region, said page with the particular link removed in response to said request.

16. The system of claim 15, wherein optimizing the page further comprises substituting the particular link with a new link embedding different second content delivered by a second third-party server as a substitute for the first content, and wherein the content delivery performance by the second third-party server into the geographic region exceeds the acceptable threshold.

17. The system of claim 15, wherein the monitoring agent monitors the content delivery performance by requesting content from each third-party server of the plurality of third-party servers.

18. The system of claim 15 further comprising a second monitoring agent deployed within a different second geographic region, the second monitoring the content delivery performance into the second geographic region by the plurality of third-party servers.

19. The system of claim 15, wherein said memory further comprises second content embedded in the final rendering of said page by a second link from the set of links, and wherein the caching server serves the second content to the user.

* * * * *